UNITED STATES PATENT OFFICE.

JUDSON R. PECK, OF ATLANTA, NEW YORK.

COMPOUND.

No. 829,031.     Specification of Letters Patent.     Patented Aug. 21, 1906.

Application filed April 2, 1906. Serial No. 309,386.

*To all whom it may concern:*

Be it known that I, JUDSON R. PECK, a citizen of the United States, residing at Atlanta, in the county of Steuben and State of New York, have invented a new and useful Compound, of which the following is a specification.

This invention relates to a compound or solution for tempering horseshoe-calks, drills, and other metal articles, and has for its object to provide a liquid or solution for the reception of the horseshoe, drill, or other article to be tempered after the same has been heated to the desired temperature.

With the above and other objects in view the invention consists in a compound or solution formed of equal parts creosol, biborate of sodium, alum, and sodium chlorid (crystal) combined with water.

In carrying the invention into effect one pound of creosol is first placed in a suitable vessel or receptacle containing eight quarts of hard water, after which one pound of biborate of sodium, one pound of alum, and one pound of sodium chlorid (crystal) are each placed in separate vessels containing two quarts of water, respectively, and the several mixtures allowed to stand for about twenty-four hours or until the several ingredients have thoroughly dissolved, the contents of each vessel being preferably stirred or otherwise agitated at frequent intervals to assist in combining the parts. The several liquids are then poured or otherwise introduced into a common vessel and thoroughly stirred until the liquids are well blended, after which the compound is allowed to stand for about twenty-four hours and hard water added until the solution has a specific gravity of approximately 1.090.

In using the compound or solution the horseshoe, drill, or other article to be tempered is first heated to the desired degree and then immersed in the solution, thereby thoroughly tempering the parts.

Having thus described the invention, what is claimed is—

1. The herein-described tempering compound consisting of creosol, biborate of sodium, alum and sodium chlorid, the same being combined with water.

2. The herein-described tempering compound consisting of equal parts of creosol, biborate of sodium, alum and sodium chlorid, the same being combined with water.

3. The herein-described tempering compound consisting of one pound of creosol combined with eight quarts of water, and one pound of biborate sodium, one pound of alum and one pound of sodium chlorid, each combined with two quarts of water, the several solutions being subsequently mixed together and incorporated with water.

4. The herein-described tempering compound consisting of one pound of creosol combined with eight quarts of hard water, one pound of biborate sodium, one pound of alum and one pound of sodium chlorid each combined with two quarts of hard water, the several solutions being placed in separate vessels and allowed to stand for about twenty-four hours and then mixed together and allowed to stand for an addition of twenty-four hours, the mixture being subsequently combined with water.

In testimony that I claim the foregoing as my own I have hereto affixed my signature in the presence of two witnesses.

JUDSON R. PECK.

Witnesses:
     HYATT C. HATCH.
     DWIGHT PIERCE.